United States Patent [19]

Henschel, Jr. et al.

[11] 4,186,099
[45] Jan. 29, 1980

[54] FILTER ASSEMBLY WITH PAPER CARTRIDGE

[75] Inventors: Arthur O. Henschel, Jr., National City; Lurin K. McCracken, Chula Vista, both of Calif.

[73] Assignee: All Services Enterprises, Inc., National City, Calif.

[21] Appl. No.: 916,481

[22] Filed: Jun. 19, 1978

Related U.S. Application Data

[63] Continuation of Ser. No. 767,842, Feb. 11, 1977, abandoned.

[51] Int. Cl.² ............................................. B01D 27/06
[52] U.S. Cl. .................................. 210/457; 210/461; 210/487; 210/493 R
[58] Field of Search ............... 210/232, 457, 461, 484, 210/486, 487, 493 R, 441, 446, 453

[56] References Cited

U.S. PATENT DOCUMENTS

| | | | |
|---|---|---|---|
| 811,151 | 1/1906 | Kneuper | 210/441 |
| 2,413,991 | 1/1947 | Newman | 210/493 X |
| 3,241,680 | 3/1966 | Humbert, Jr. | 210/493 X |
| 3,498,464 | 3/1970 | Frosolone | 210/493 X |
| 3,508,657 | 4/1970 | Cooper | 210/232 X |
| 3,950,251 | 4/1976 | Hiller | 210/232 |

*Primary Examiner*—William A. Cuchlinski, Jr.
*Attorney, Agent, or Firm*—Brown & Martin

[57] ABSTRACT

A consumer rebuildable filter cartridge for mounting in a fluid filter chamber in a fluid flow path includes inner and outer perforated tubular members mounted coaxially on a fixed end cap to form an annular chamber. A filter element of pleated sheet filter material is formed in a tubular construction and fitted into the annular space defined between the inner and outer tubular members and is sealed at each end by suitable resilient seal washers, compressed between the fixed end cap and a movable end cap. The inner and outer tubular members forms support structure for supporting the tubular paper filter element and permits the removal and replacement of such filter elements.

2 Claims, 4 Drawing Figures

FILTER ASSEMBLY WITH PAPER CARTRIDGE

This is a continuation, of application Ser. No. 767,842, filed Feb. 11, 1977 now abandoned.

BACKGROUND OF THE INVENTION

The present invention relates to filter elements and pertains particularly to a rebuildable filter cartridge.

Filtering systems are in wide use in many industries which utilize fluid which must be maintained in a clean condition. Dry cleaning plants, for example, utilize a considerable number of filters in maintaining the cleaning fluid in a usable condition. Such filters usually utilize a replaceable cartridge which is substantially tubular in configuration and fits within a filter chamber for filtering fluid passing therethrough. When the filter cartridge becomes sufficiently dirty that the flow of fluid through the system is inhibited, the cartridge is replaced.

Such cartridges are normally constructed of a metal support shell or frame having a tubular shaped body of filtering or absorbing material. The metal frame is built into the cartridge and supports the filter material and permits an axial load to be applied thereon for sealing purposes. When the cartridge is discarded the metal frame material is likewise discarded. This adds considerably to the expense of such filtering systems.

It is therefore desirable that a suitable filtering cartridge be available which eliminates this expense by permitting the filter material to be replaced independently of the filter cartridge support member.

SUMMARY AND OBJECTS OF THE INVENTION

Accordingly it is the primary object of the present invention to overcome the above problems of the prior art.

Another object of the present invention is to provide a rebuildable filter cartridge.

A still further object of the present invention is to provide a filter cartridge having support structure for supporting a filter material which can be disassembled for replacing the filter material.

In accordance with the primary aspect of the present invention a filter cartridge is constructed to have a support structure which may be disassembled for replacing the filtering material of the cartridge.

BRIEF DESCRIPTION OF THE DRAWING

The above and other objects and advantages of the present invention will become apparent from the following description when read in conjunction with the drawings, wherein.

DETAILED DESCRIPTION OF A PREFERRED EMBODIMENT

Figure 2:
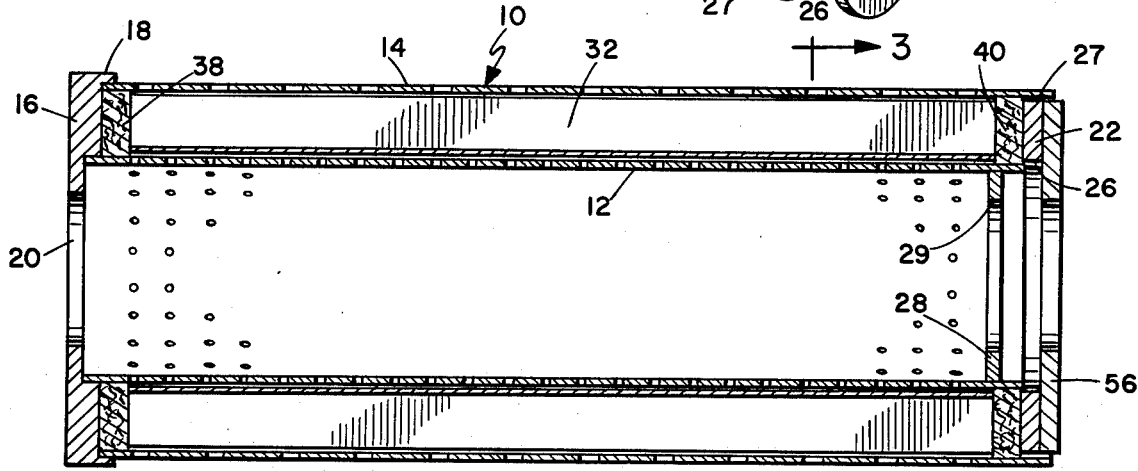
FIG. 2 is a diametrical sectional view of the assembled filter, taken along the longitudinal axis.

Turning now to the drawings, a filter assembly in accordance with the present invention is designated generally by the numeral 10. This filter assembly comprises an inner perforated tubular member 12 and an outer perforated member 14. These members are mounted as best seen in FIG. 2 in coaxial relationship and supported by suitable support or mounting means in the form of a first annular end cap or washer 16 secured to one end of the inner tubular member 12 and extending radially outward therefrom and including a annular flange 18 for receiving the end of the outer tubular member 14. The end cap 16 also extends inward toward the axis of the inner tubular member 12 as shown and includes an inner bore 20 for receiving a support member for mounting within a filter chamber, as will be described herein below. A second washer or end cap member 22 is mounted on the opposite end of the inner tubular member 12 and has an inner bore 26 which fits over member 12. The outer diameter of the end cap 22 terminates as shown in a edge 27 falling short of the inner diameter of the tubular member 14 for fitting therein. Inside tubular member 12, adjacent the end remote from end cap 16, is a support ring 28 having a bore 29 the same size as bore 20.

Figure 3:
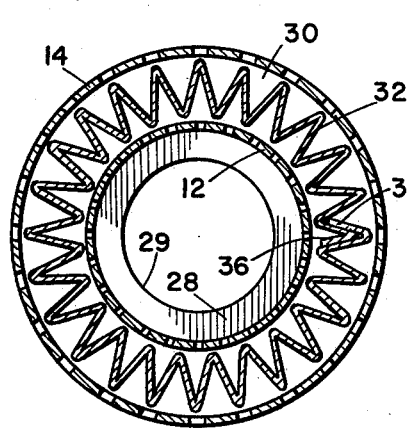
FIG. 3 is a sectional view taken on line 3—3 of FIG. 2.

The inner and outer tubular members 12 and 14 define an annular space 30 therebetween as best seen in FIG. 3. Mounted within this space 30 is an tubular shaped filter element 32 constructed of a suitable filtering material such as filter paper, mineral fiber, porous metal or the like, formed in a pleated or a corregated configuration as illustrated. Such sheets can then be torn or cut off large rolls of the pleated material and opposite ends 34 and 36 are overlapped for one or two pleats, or may be secured together in a suitable manner such as by stapling or gluing to form the tubular member. The pleating or corrugation strengthens the sheet for axial loads for sealing purposes and also increases the filter area of the filter.

The ends of the filter element 32 are engaged by the pair of annular sealed members 38 and 40 confined or compressed between the ends thereof and the end caps 16 and 22. These seal members are preferably of a thick resilient material, such as felt, to accommodate variation in the length of the filter element 32 and permit sufficient sealing force to be applied to the ends thereof without crushing or collapsing the filter element.

Figure 1:
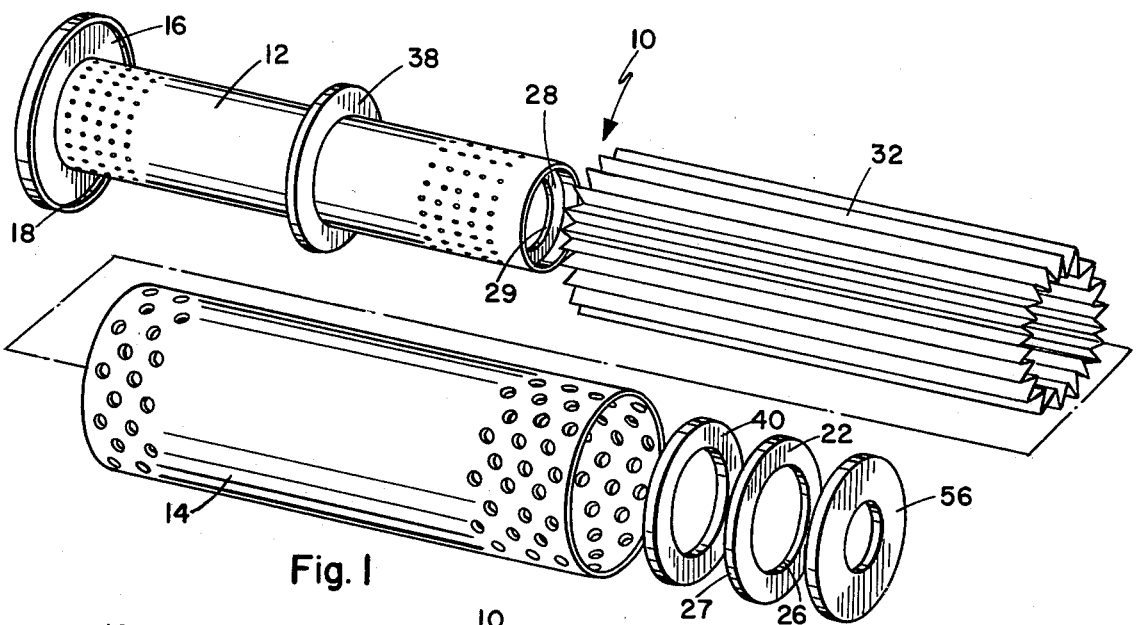
FIG. 1 is an exploded perspective view of the filter in accordance with the present invention.

In assembling the filter element as best seen in FIG. 1, the inner tubular member 12 with attached end plate or cap 16 is selected and seal ring 38 is placed over the tube 12 and positioned against cap member 16. A suitable sheet of filter material 32 is formed in a tubular configuration and slipped over the tubular member 12 with one end in engagement with sealing member 38. The outer tubular member 14 is then slipped over the filter element 32 and annular seal element 40 and end cap 22 then placed in position over the end of the tubular member 12 as illustrated in FIG. 2.

Figure 4:
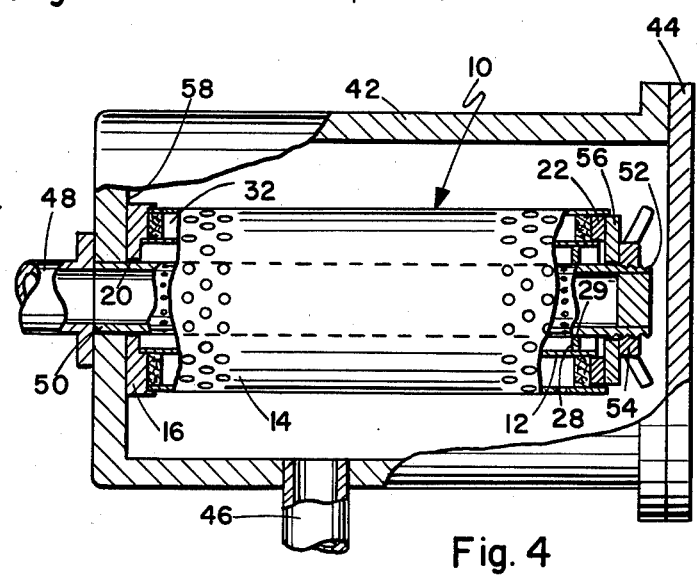
FIG. 4 is a side elevational view with portions cutting away of the filter in a typical installation.

The filter element is usable in filtering systems including a filter chamber, such as illustrated in FIG. 4, defined by a substantially cylindrical housing 42 having an end plate 44 which is removable for permitting the cartridge to be inserted and removed therefrom. The filter housing 42 includes a radial inlet at 46 and an axial outlet at 48. An axially extending tubular mounting member 50 is secured within the housing coaxial thereof and in open communication with the outlet 48. This mounting member passes through bores 20 and 29 and supports the filter, and has multiple perforations for permitting the flow of fluid through the filter into the outlet passageway. The outer end of the tubular member 50 includes screw threads 52 for engagement by a suitable nut such as a wing nut 54, for applying axial pressure to the filter assembly. A washer 56 is positioned between the nut 54 and the end cap 22 of the cartridge assembly, the washer being a sliding fit on tubular member 50. The end cap 16 of the cartridge is biased into engagement with the annular surface of wall 58 of the housing surrounding the outlet 48. Suitable seal means such as an annular seal member or washer may be provided if needed. Filter 32 is compressed axially and sealed between seals 38 and 40, which also seal the annulus between tubular members 12 and 14.

Flow of fluid through the filter system is into the inlet 46 and through the filter cartridge and out the outlet 48.

This described assembly provides a cartridge assembly which is rebuildable by the consumer. The consumer need only have the support shell structure consisting of the inner and outer tubular members 12 and 14, the end cap members 16 and 22, and the seal members 38 and 40. He then selects a suitable filtering paper or sheet material, preferably having a pleated configuration as shown and a width to match the length of the tubular members. A suitable length of the filter material or sheet is then cut off and formed in a tubular configuration and inserted within the cartridge housing assembly. When the filter element or paper 30 needs replacing the cartridge assembly 10 is merely disassembled and the filter material replaced. This arrangement saves considerable expense in that only the filter material or sheet of filter material 32 need be discarded. The expensive structural metal portions of the cartridge are retained.

While the invention is described and illustrated by means of a single embodiment it is to be understood that numerous changes and modifications may be made therein without departing from the spirit and scope of the invention as defined in the appended claims.

Having described my invention, I now claim:

1. In a filter assembly including a cylindrical housing having an inlet, a co-axially disposed perforated outlet and support tube non-detachably fixed to and extending substantially the length of the housing, and a cartridge retainer nut threadably mounted on the end of said outlet and support tube, the improvement comprising:

a refillable filter cartridge consisting of an inner perforated tubular member and an outer perforated tubular member, a first end cap non-detachably fixed on one end of said inner tubular member having an inner through bore slidably fixed on said support tube for supporting said inner perforated tubular member on said support tube, and an annular flange fitting over the end of said outer perforated tubular member for supporting said outer perforated tubular member in spaced relationship to said inner perforated tubular member, an annular support member supporting the outer end of the inner perforated tubular member on said support tube, a removable pleated tubular filter element disposed between said inner and said outer perforated tubular members, a second cap member detachably engaging the other end of said inner and said outer perforated tubular members, an annular resilient seal disposed between each end of said tubular filter element and each of said cap members, and said retainer nut biasing said second cap member axially along said support tube for biasing said resilient seals into sealing engagement with the ends of said tubular filter element and said cap members, and biasing said second end cap into tight engagement with said inner and outer tubular members and thereby detachably retaining said members together on said support tube.

2. The filter assembly of claim 1, wherein said annular resilient seals are felt washers.

* * * * *